US010614576B2

(12) United States Patent
Jaroch

(10) Patent No.: US 10,614,576 B2
(45) Date of Patent: Apr. 7, 2020

(54) METHOD AND DEVICE FOR PARTITION-BASED IMAGE TRACKING

(71) Applicant: Colossio, Inc., Chicago, IL (US)

(72) Inventor: Joseph A. Jaroch, Chicago, IL (US)

(73) Assignee: Colossio, Inc., Chicago, IL (US)

(*) Notice: Subject to any disclaimer, the term of this patent is extended or adjusted under 35 U.S.C. 154(b) by 165 days.

(21) Appl. No.: 15/888,587

(22) Filed: Feb. 5, 2018

(65) Prior Publication Data

US 2019/0244370 A1 Aug. 8, 2019

(51) Int. Cl.
*G06K 9/00* (2006.01)
*G06T 7/246* (2017.01)
*G06T 7/73* (2017.01)

(52) U.S. Cl.
CPC .............. *G06T 7/248* (2017.01); *G06T 7/74* (2017.01); *G06T 2207/10004* (2013.01); *G06T 2207/20021* (2013.01)

(58) Field of Classification Search
CPC . G06T 2207/10004; G06T 2207/20021; G06T 7/248; G06T 7/74
See application file for complete search history.

(56) References Cited

U.S. PATENT DOCUMENTS

| 6,445,832 B1* | 9/2002 | Lee | G06K 9/32 382/266 |
|---|---|---|---|
| 2008/0107307 A1* | 5/2008 | Altherr | H04N 5/23248 382/107 |
| 2010/0271484 A1* | 10/2010 | Fishwick | H04N 5/145 348/169 |
| 2011/0261225 A1* | 10/2011 | Niinami | H04N 5/23212 348/223.1 |
| 2012/0189212 A1* | 7/2012 | Ren | G06F 16/785 382/218 |

* cited by examiner

*Primary Examiner* — Tom Y Lu
(74) *Attorney, Agent, or Firm* — Barnes & Thornburg LLP

(57) ABSTRACT

Methods for partition-based image tracking are provided. In one aspect, a method includes determining a number of partitions for each image frame of image frames and dividing a first image frame of the image frames into first partitions and a second image frame of the image frames into second partitions based on the number of partitions. The method also includes detecting for a change between each of the first partitions of the first image frame and a corresponding second partition of the second partitions of the second image frame. The method also includes configuring priority settings for the second partitions based on the detection, and processing the second image frame and a third image frame based on the priority settings to detect for a change between each of the second partitions and a corresponding third partition of third partitions of a third image. Systems and machine-readable media are also provided.

18 Claims, 10 Drawing Sheets

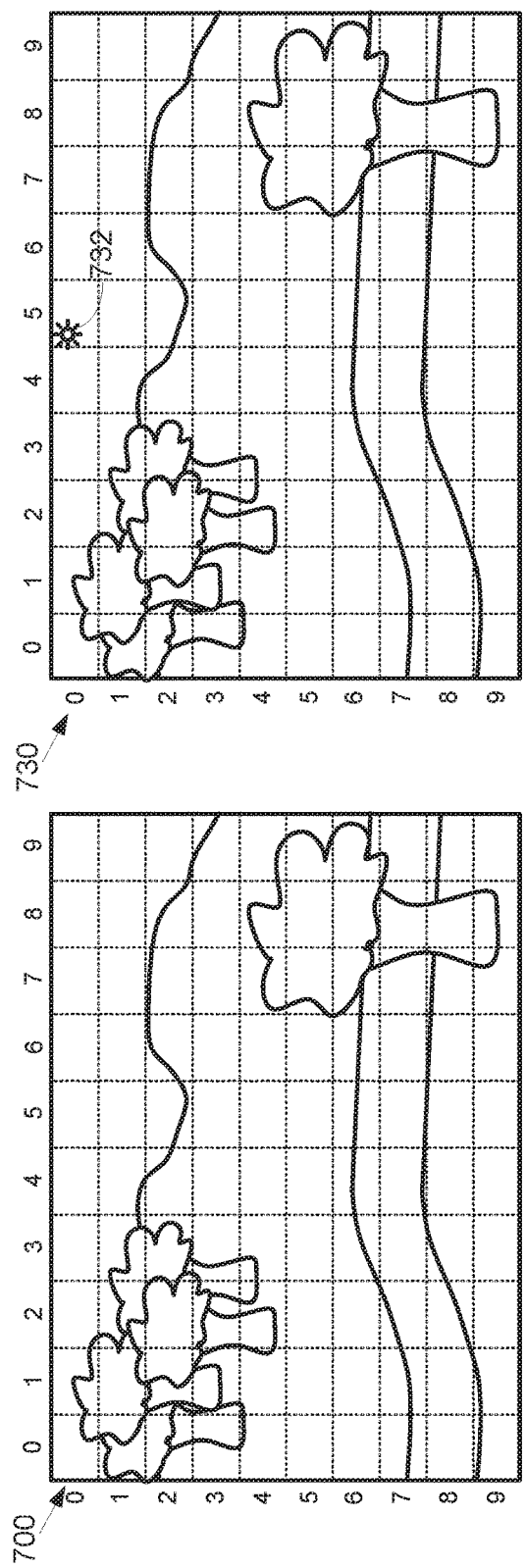
FIG. 7A
FIG. 7B
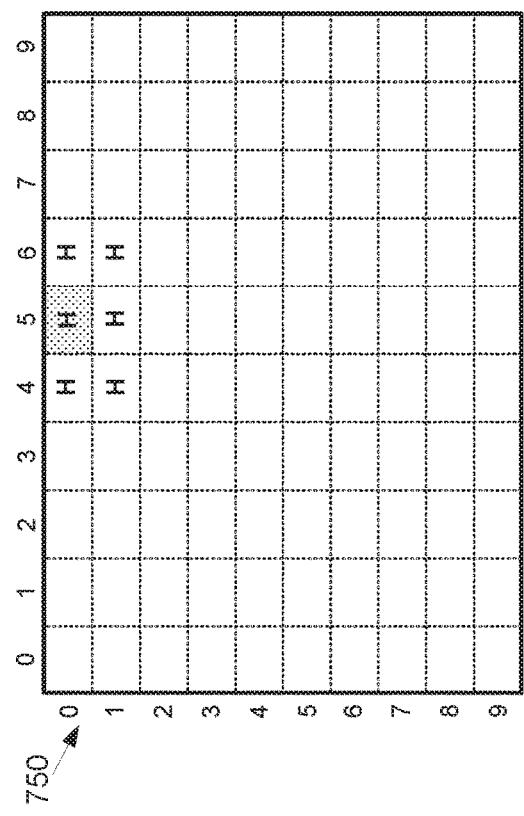
FIG. 7C

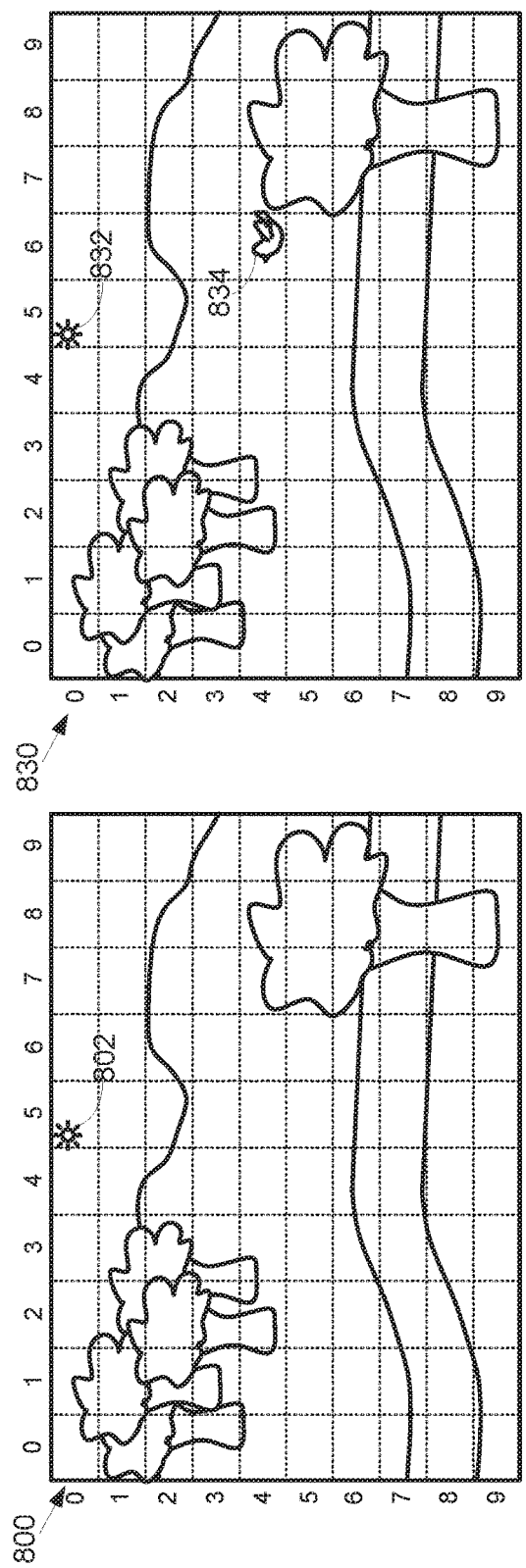
FIG. 8A
FIG. 8B
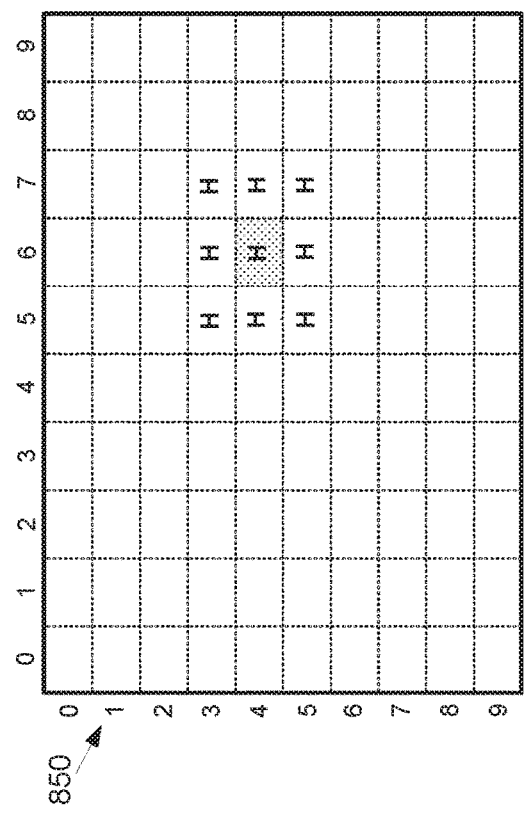
FIG. 8C

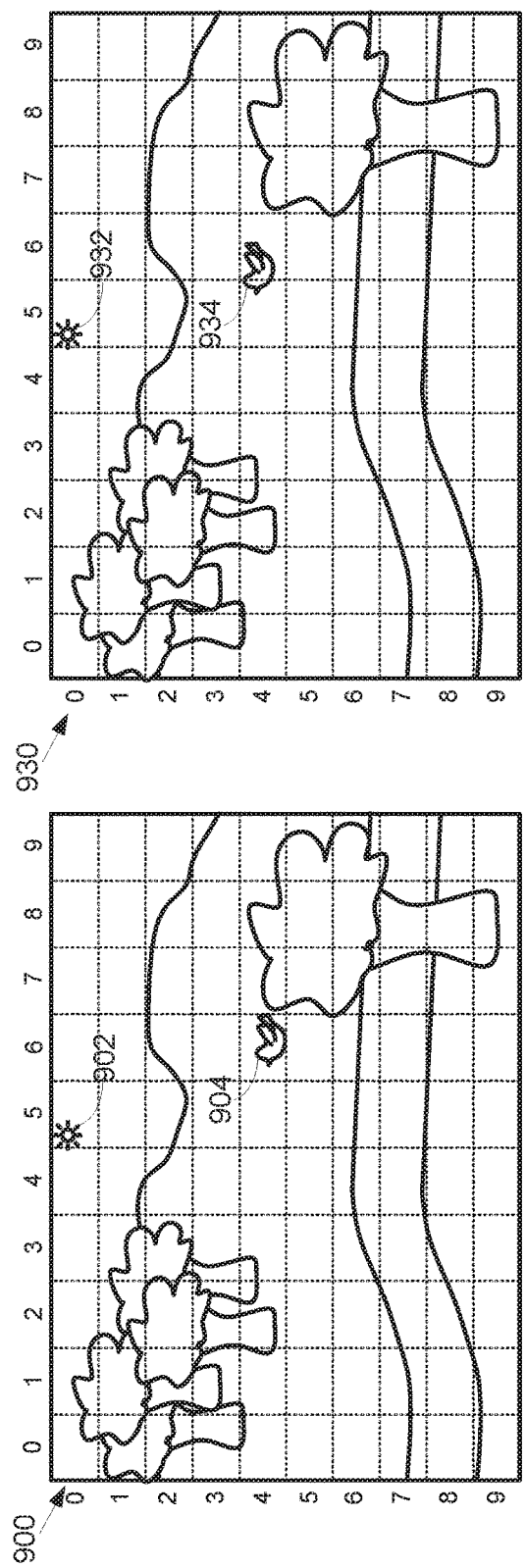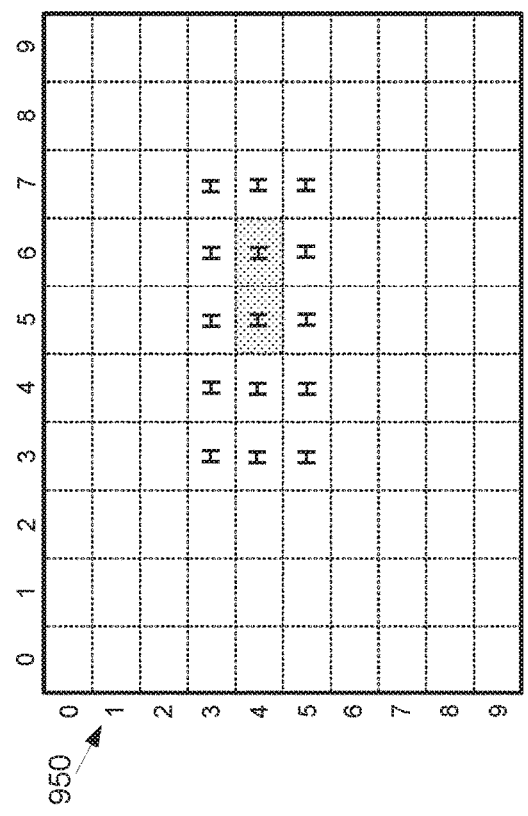
FIG. 9A
FIG. 9B
FIG. 9C

METHOD AND DEVICE FOR PARTITION-BASED IMAGE TRACKING

TECHNICAL FIELD

The present disclosure generally relates to image processing, and more specifically relates to image tracking.

BACKGROUND

Image frames may be processed for various purposes. One of widely used image processing approaches is image tracking to detect and track changes in images to identify motion. With development of imaging technologies, capturing of high resolution image frames at a fast rate has become available. However, even with a powerful processor, processing a large amount of data may be computationally burdensome and time-consuming. Therefore, traditionally, image frames captured by high frame-rate cameras are first stored in a storage device and are processed more slowly than real-time, processing the captured image frames for image tracking after the capturing of the image frames is complete.

The description provided in the background section should not be assumed to be prior art merely because it is mentioned in or associated with the background section. The background section may include information that describes one or more aspects of the subject technology.

SUMMARY

The disclosed system provides an efficient image tracking approach that may reduce time and/or computational resources used for image tracking. An application may be installed on a server. Each image frame may be divided into multiple partitions, and multiple partitions of one image frame are respectively compared with multiple partitions of another image frame to detect a change at a partition level. If a change is detected in a particular partition of the multiple partitions, high priority is assigned to the particular partition and adjacent partitions that are adjacent to the particular partition with the change. Then, detection for changes in partitions of subsequent image frames may be prioritized for the partitions assigned with the high priority.

According to certain aspects of the present disclosure, a computer-implemented method is provided. The method includes determining a number of partitions for each image frame of a plurality of image frames. The method also includes dividing a first image frame of the plurality of image frames into a plurality of first partitions and a second image frame of the plurality of image frames into a plurality of second partitions based on the number of partitions. The method also includes detecting for a change between each of the plurality of first partitions of the first image frame and a corresponding second partition of the plurality of second partitions of the second image frame. The method also includes configuring priority settings for the plurality of second partitions based on the detection. The method also includes processing the second image frame and a third image frame based on the configured priority settings to detect for a change between each of the plurality of second partitions of the second image frame and a corresponding third partition of a plurality of third partitions of a third image.

According to certain aspects of the present disclosure, a system is provided including a memory, and a processor configured to execute instructions. When executed, the instructions cause the processor to determine a number of partitions for each image frame of a plurality of image frames. The instructions also cause the processor to divide a first image frame of the plurality of image frames into a plurality of first partitions and a second image frame of the plurality of image frames into a plurality of second partitions based on the number of partitions. The instructions also cause the processor to detect for a change between each of the plurality of first partitions of the first image frame and a corresponding second partition of the plurality of second partitions of the second image frame. The instructions also cause the processor to configure priority settings for the plurality of second partitions based on the detection. The instructions also cause the processor to process the second image frame and a third image frame based on the configured priority settings to detect for a change between each of the plurality of second partitions of the second image frame and a corresponding third partition of a plurality of third partitions of a third image.

According to certain aspects of the present disclosure, a non-transitory machine-readable storage medium is provided that includes machine-readable instructions for causing a processor to execute a method detecting a presence of a user. The method includes determining a number of partitions for each image frame of a plurality of image frames. The method also includes dividing a first image frame of the plurality of image frames into a plurality of first partitions and a second image frame of the plurality of image frames into a plurality of second partitions based on the number of partitions. The method also includes detecting for a change between each of the plurality of first partitions of the first image frame and a corresponding second partition of the plurality of second partitions of the second image frame. The method also includes configuring priority settings for the plurality of second partitions based on the detection. The method also includes processing the second image frame and a third image frame based on the configured priority settings to detect for a change between each of the plurality of second partitions of the second image frame and a corresponding third partition of a plurality of third partitions of a third image.

According to certain aspects of the present disclosure, a system is provided. The system includes means for determining a number of partitions for each image frame of a plurality of image frames. The system includes means for dividing a first image frame of the plurality of image frames into a plurality of first partitions and a second image frame of the plurality of image frames into a plurality of second partitions based on the number of partitions. The system includes means for detecting a change between each of the plurality of first partitions of the first image frame and a corresponding second partition of the plurality of second partitions of the second image frame. The system includes means for configuring priority settings for the plurality of second partitions based on the detection. The system includes means for processing the second image frame and a third image frame based on the configured priority settings to detect for a change between each of the plurality of second partitions of the second image frame and a corresponding third partition of a plurality of third partitions of a third image.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings:

FIGS. 7A-7C are example diagrams illustrating the partition-based image tracking in multiple image frames, according to certain aspects of the disclosure.

FIGS. 8A-8C are example diagrams illustrating the partition-based image tracking in multiple image frames, according to certain aspects of the disclosure.

FIGS. 9A-9C are example diagrams illustrating the partition-based image tracking in multiple image frames, according to certain aspects of the disclosure.

Figure 1:
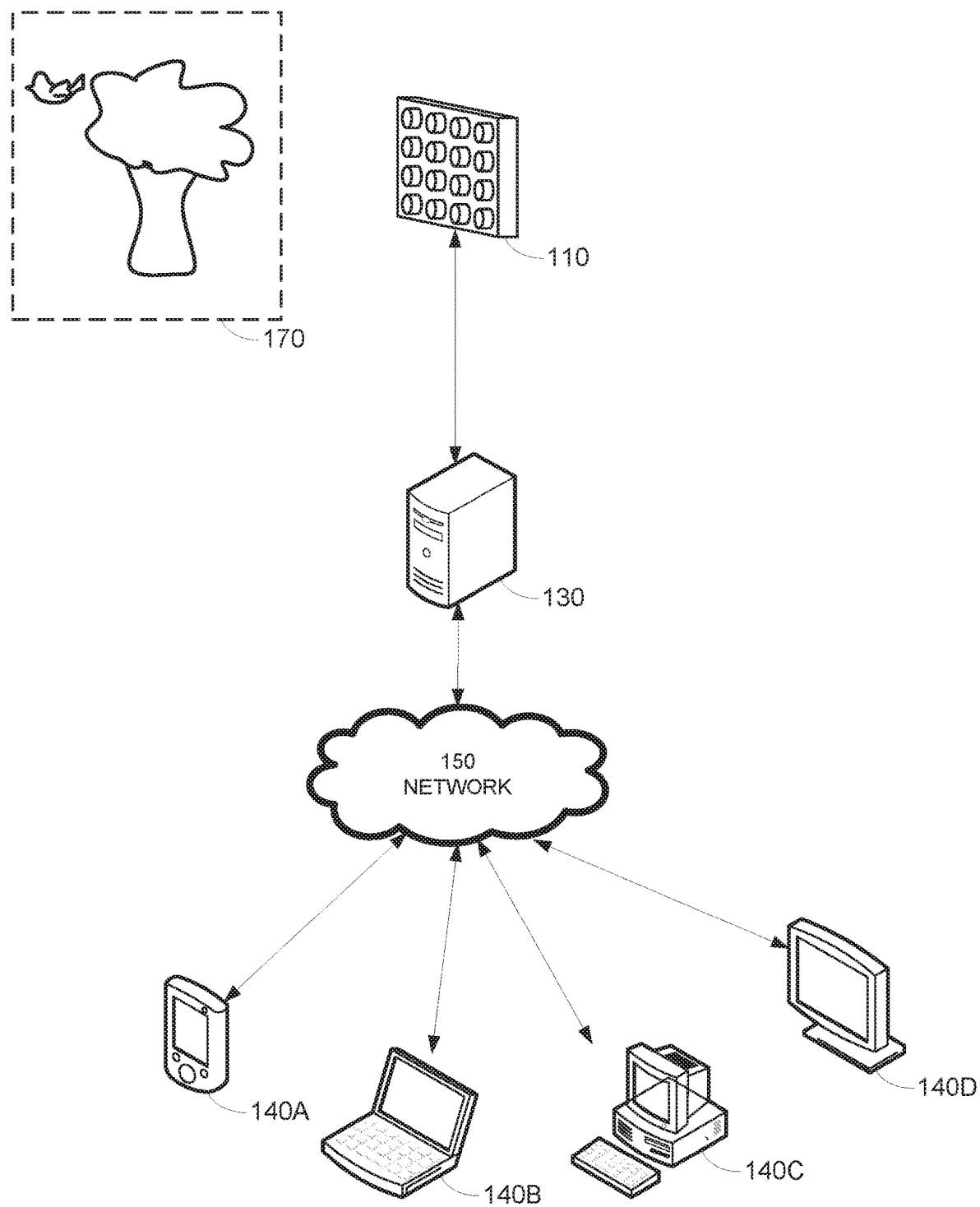
FIG. 1 illustrates an example architecture for partition-based image tracking.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Image tracking may be performed by comparing image frames to detect a change between one image frame and a subsequent image frame. Image tracking is traditionally performed on the image frames pixel-by-pixel to detect changes in the pixel values between image frames. In one example, the image tracking may be performed linearly, starting from a top left corner of an image frame and ending at a bottom right corner of an image frame. In such an example, if a large volume of image frames are processed, sufficient resources may not be available to process the area near the bottom of the image frame in real-time image tracking. With advancement of processing hardware, real-time image tracking is becoming feasible for certain cases, such as cases involving low frame-rate image capture and/or low resolution images. High frame-rate cameras may enable capturing of many image frames per second and thus a highly efficient image tracking technique may be necessary for fast processing. For example, performing real-time image tracking on image frames acquired with high frame-rate cameras may be challenging because of a large number of image frames to process in a short period of time. Further, if the image frames are captured in high resolution, the image frames include a large amount of data and thus the image tracking may become computationally expensive and time consuming. Therefore, an efficient image tracking approach is desired, especially for image processing that may involve a large amount of data.

The disclosed system provides a partition-based image tracking approach to detect changes in image frames. In particular, each image frame is divided into multiple partitions to detect for a change in each partition of an image frame and a priority for image tracking is given to a partition that shows a change and a corresponding partition of a subsequent image frame. When a camera device captures a series of sequential image frames, partitions of first and second image frames may be compared to detect for a change. A partition with a change is placed in high priority, such that the partition with the change in the second image frame and a corresponding partition of a subsequent third image frame are processed to detect for a change before processing other partitions without a change. In some aspects, adjacent partitions that are adjacent to the partition with the change may also be placed in high priority to account for any sudden changes or motion. As such, the adjacent partitions in the second image frame and corresponding partitions of the subsequent third image frame are also processed before processing other partitions without a change. Additionally, the disclosed system may utilize multiple processing threads and/or multiple processor cores, such that multiple partitions may be processed simultaneously using the multiple processing threads and/or the multiple processor cores to detect for a change.

The disclosed system addresses a technical problem tied to computer technology associated with processing image frames for image tracking by allowing computer performance of a function not previously performed by a computer. The disclosed system solves the technical problem by dividing each image frame into multiple partitions to detect a change between image frames at a partition level and prioritizing partitions near which a change has occurred for image tracking. Because the disclosed system performs detection for a change at a partition level instead of performing the detection at a pixel level, the disclosed system may detect an area with a change faster than comparing individual pixels to detect for a change. Therefore, by implementing the disclosed system, the time consumed by image tracking may be significantly reduced. Further, if a change is detected in a particular partition of an image frame, there is likelihood that a change will be detected in a region at or around the corresponding partition in a subsequent image frame and thus such a region may be prioritized for image tracking. Prioritizing an image region with likelihood of change in image tracking may increase a chance to detect a changed region in the image faster as partitions with likelihood of change are processed first to detect for a change. Further, by utilizing multiple processing threads and/or multiple processor cores for simultaneous processing of multiple partitions, the processing time may be further reduced. Because the disclosed system significantly reduces the processing time, real-time image tracking may be feasible using the disclosed system.

Example System Architecture

FIG. 1 illustrates an example architecture 100 for partition-based image tracking. The architecture 100 includes an image capturing device 110 connected to a server 130. The server 130 may be connected to one or more client devices 140A-140D over a network 150 or via a wired connection. The server 130 can be any device having an appropriate processor, memory, and communications capability, and processing capability for processing image frames (e.g., for image tracking). For example, the server 130 may be capable of utilizing the image capturing device 110 to acquire image frame(s) of a target area 170. The server 130 may be capable of processing image frames. In some embodiments, the server 130 may include multiple processor cores and thus may be able to process multiple threads simultaneously using the multiple processor cores.

The image capturing device 110 may include a single camera or multiple cameras (e.g., arranged as a camera array). If the image capturing device 110 includes multiple cameras, an image frame captured by the image capturing device 110 may include multiple portions respectively captured by the multiple cameras. The image capturing device 110 may capture image frame(s) of a target area, such as the target area 170 in front of the image capturing device 110. The image capturing device 110 may include one or more high speed cameras capable of capturing image frames at a high speed (e.g., over 1000 frames per second). In some aspects, the image capturing device 110 may be stationary, fixed at a specific location.

The number of frames that can be captured by the image capturing device 110 per second may depend on resources and processing power of the server 130. In an aspect, the number of image frames that can be captured per second may depend on a size of each image frame. For example, reducing a size of each image frame to be captured may allow the image capturing device 110 and the server 130 to capture more image frames per second.

The client device 140 can be any device having an appropriate processor, memory, communications capability, and capability for performing one or more actions triggered by the server 130. The client device 140 to which the server 130 is connected over the network 150 can be, for example, desktop computers, mobile computers, tablet computers (e.g., including e-book readers), mobile devices (e.g., a smartphone or PDA), or any other devices having appropriate processor, memory, communications capabilities, and capability for performing various actions in response to detection of a change in an image frame.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Partition-Based Image Tracking

Figure 2:
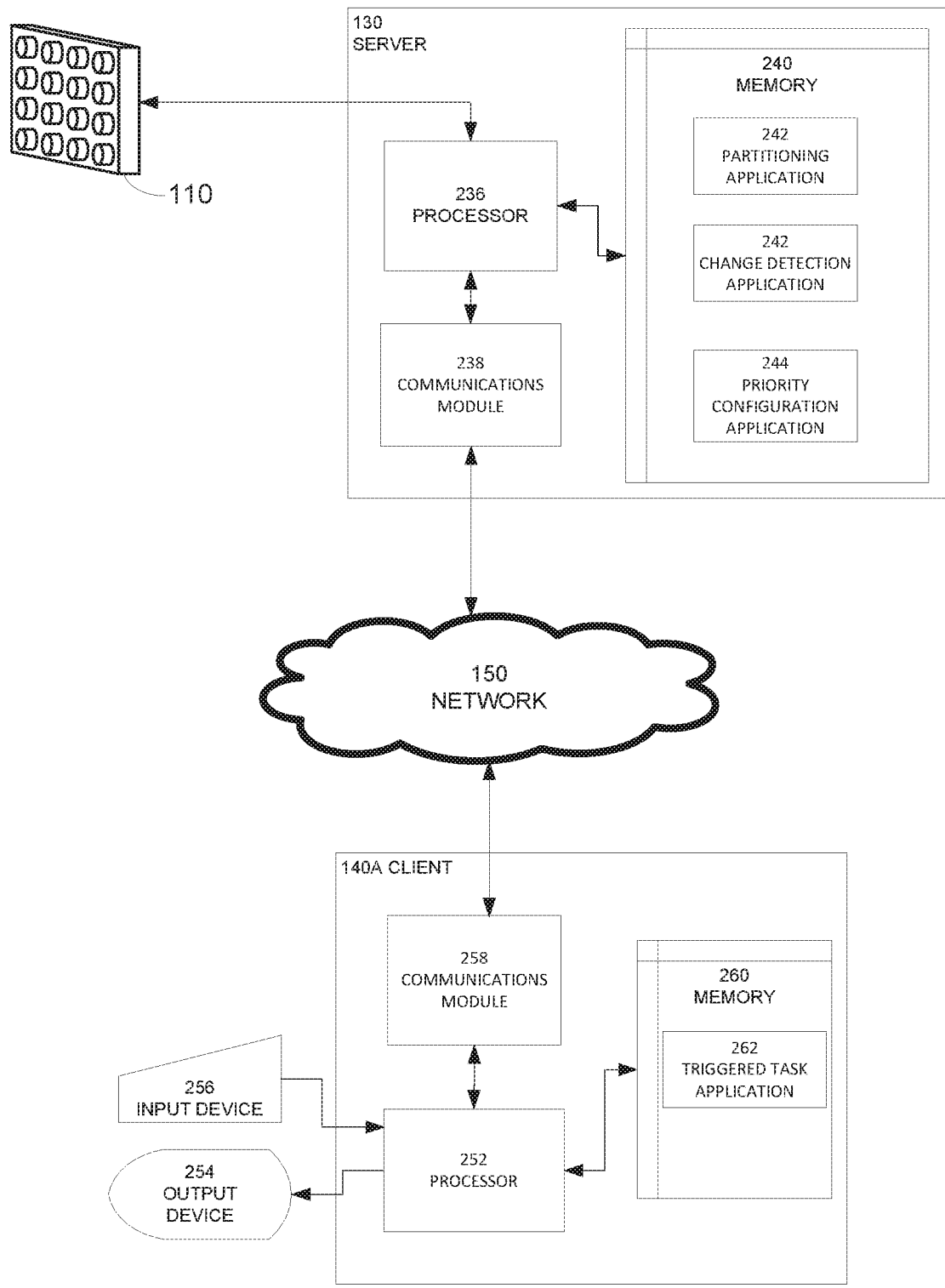
FIG. 2 is a block diagram illustrating the example image capturing device, the example server, and the example client device from the architecture of FIG. 1, according to certain aspects of the disclosure.

FIG. 2 is a block diagram illustrating an example image capture device 110, server 130, and a client device 140A from the architecture of FIG. 1 according to certain aspects of the disclosure. The image capture device 110 is connected to a processor 236 of the server 130, such that image frames captured by the image capture device 110 may be communicated to the processor 236 of the server 130. The server 130 and the client device 140A are connected over the network 150 via respective communications modules 238 and 258. The communications modules 238 and 258 are configured to interface with the network 150 and to receive information, such as data, requests, responses, and commands to other devices on the network. The communications modules 238 and 258 can be, for example, modems or Ethernet cards.

The server 130 includes processor 236, communications module 238, and memory 240. The memory 240 may include a partitioning application 242, a change detection application 244, and a priority configuration application 246. The processor 236 of the server 130 is configured to execute instructions, such as instructions physically coded into the processor 236, instructions received from software in memory 240, or a combination of both.

For example, the processor 236 of the server 130 executes the partitioning application 242 to determine a number of partitions for each image frame of a plurality of image frames. The plurality of image frames may be captured by the processor 236 using the image capturing device 110, and may be stored in the memory 240. In some aspects, the number of partitions for each image frame may be based on at least one of a computing resource or a change detection algorithm. In some aspects, each partition of the plurality of image frames may be assigned to a corresponding discrete processing thread.

Subsequently, the processor 236 of the server 130 executes the partitioning application 242 to divide a first image frame of the plurality of image frames into a plurality of first partitions and a second image frame of the plurality of image frames into a plurality of second partitions based on the number of partitions. Then, the processor 236 may execute the change detection application 244 to detect for a change between each of the plurality of first partitions of the first image frame and a corresponding second partition of the plurality of second partitions of the second image frame.

In some aspects, the processor 236 may execute the change detection application 244 to detect for the change between each of the plurality of first partitions and the corresponding second partition by: computing a plurality of first checksums based on the plurality of first partitions respectively, computing a plurality of second checksums based on the plurality of second partitions respectively, and comparing the plurality of first checksums and the plurality of second checksums respectively to detect for the change. Additionally, in some aspects, the processor 236 may execute the change detection application 244 to detect for the change between each of the plurality of first partitions and the corresponding second partition further by: determining that one or more first checksums of the plurality of first checksums match one or more second checksums of the plurality of second checksums, respectively, computing one or more refined first checksums based on one or more first partitions corresponding to the one or more first checksums and one or more refined second checksums based on one or more second partitions corresponding to the one or more second checksums, and comparing the one or more refined first checksums and the one or more refined second checksums to detect for the change. In such aspects, the plurality of first checksums and the plurality of second checksums are determined using a fast checksum algorithm, and wherein the one or more refined first checksums and the one or more refined second checksums are determined using a slow checksum algorithm.

In some aspects, the processor 236 may execute the change detection application 244 to detect for the change between each of the plurality of first partitions and the corresponding second partition by: determining that the change is detected between at least one partition of the plurality of first partitions and at least one corresponding partition of the plurality of second partitions; generating a difference image based on differences between the at least one partition of the plurality of first partitions and the at least one corresponding partition of the plurality of second partitions; determining at least one contour based on the difference image; identifying a changed area within the at least one partition of the plurality of second partitions based on the at least one contour; and storing a center point of the changed area.

The processor 236 executes the priority configuration application 246 to configure priority settings for the plurality of second partitions based on the detection. The processor 236 executes the change detection application 244 to process the second image frame and a third image frame based on the configured priority settings to detect for a change between each of the plurality of second partitions of the second image frame and a corresponding third partition of a plurality of third partitions of a third image.

In some aspects, the priority settings may be configured by setting priority values to the plurality of second partitions based on proximity to a partition of the second partition where the change is detected. In such aspects, the processor 236 may execute the change detection application 244 to process the second image frame and a third image frame by processing the plurality of second partitions and the plurality of third partitions based on an order of the set priority values.

In some aspects, the processor 236 may execute the priority configuration application 246 to configure the priority settings by: assigning a high priority value to at least one partition of the plurality of second partitions, wherein a change is detected in the at least one partition of the plurality of second partitions from at least one corresponding partition of the plurality of first partitions, and assigning the high priority value to one or more adjacent second partitions that are adjacent to the at least one partition of the plurality of second partitions. In such aspects, the processor 236 may execute the priority configuration application 246 to configure the priority settings by assigning a low priority value to one or more partitions of the plurality of second partitions that are without a change from corresponding one or more partitions of the plurality of first partitions and are spaced apart from the at least one partition of the plurality of second partitions. In some aspects, the processor 236 may execute the change detection application 244 to process the second image frame and a third image frame by: performing a first detection for a change between the at least one partition of the plurality of second partitions where the high priority value is assigned and at least one corresponding partition of the plurality of third partitions, and performing, after the first detection, a second detection for a change between one or more partitions of the plurality of second partitions without the high priority value and one or more corresponding partitions of the plurality of third partitions. In some aspects, the processor 236 may execute the change detection application 244 to process the second image frame and a third image frame by placing the at least one partition of the plurality of second partitions and the one or more adjacent second partitions in a high priority queue, where high priority third partitions of the plurality of third partitions that respectively correspond with the at least one partition of the plurality of second partitions and the one or more adjacent second partitions in the high priority queue are processed before one or more partitions of the plurality of third partitions that are absent from the high priority queue.

In some aspects, the processor 236 of the server 130 may execute instructions to determine that no change is detected for a priority duration in partitions of an image frame corresponding with the at least one partition of the plurality of second partitions and the one or more adjacent second partitions, and upon expiration of the priority duration, reset the configured priority settings.

In some aspects, the processor 236 may execute the priority configuration application 246 to configure the priority settings by: determining that a width of a changed region based on the detection exceeds a width change threshold, and resetting the priority settings upon the determination that the width of the changed region exceeds a width change threshold.

In some aspects, the processor 236 of the server 130 may execute instructions to trigger one or more actions when at least one of a change between the first image frame and the second image frame or a change between the second image frame and the third image frame is detected. The one or more actions may involve the client device 140A, via the communications module 238 of the server 130, the network 150, and the communications module 258 of the client device 140A.

The client device 140A includes a processor 252, a communications module 258, and a memory 260. The client 110B may also include an input device 256, such as a keyboard or mouse, and an output device 254, such as an LCD monitor, a speaker, etc. The processor 252 of the client device 140A is configured to execute instructions, such as instructions physically coded into the processor 252, instructions received from software in memory 260, or a combination of both. For example, the processor 252 of client 140B may execute a triggered task application 262 to perform an action triggered by the server 130 when at least one of a change between the first image frame and the second image frame or a change between the second image frame and the third image frame is detected.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 3:
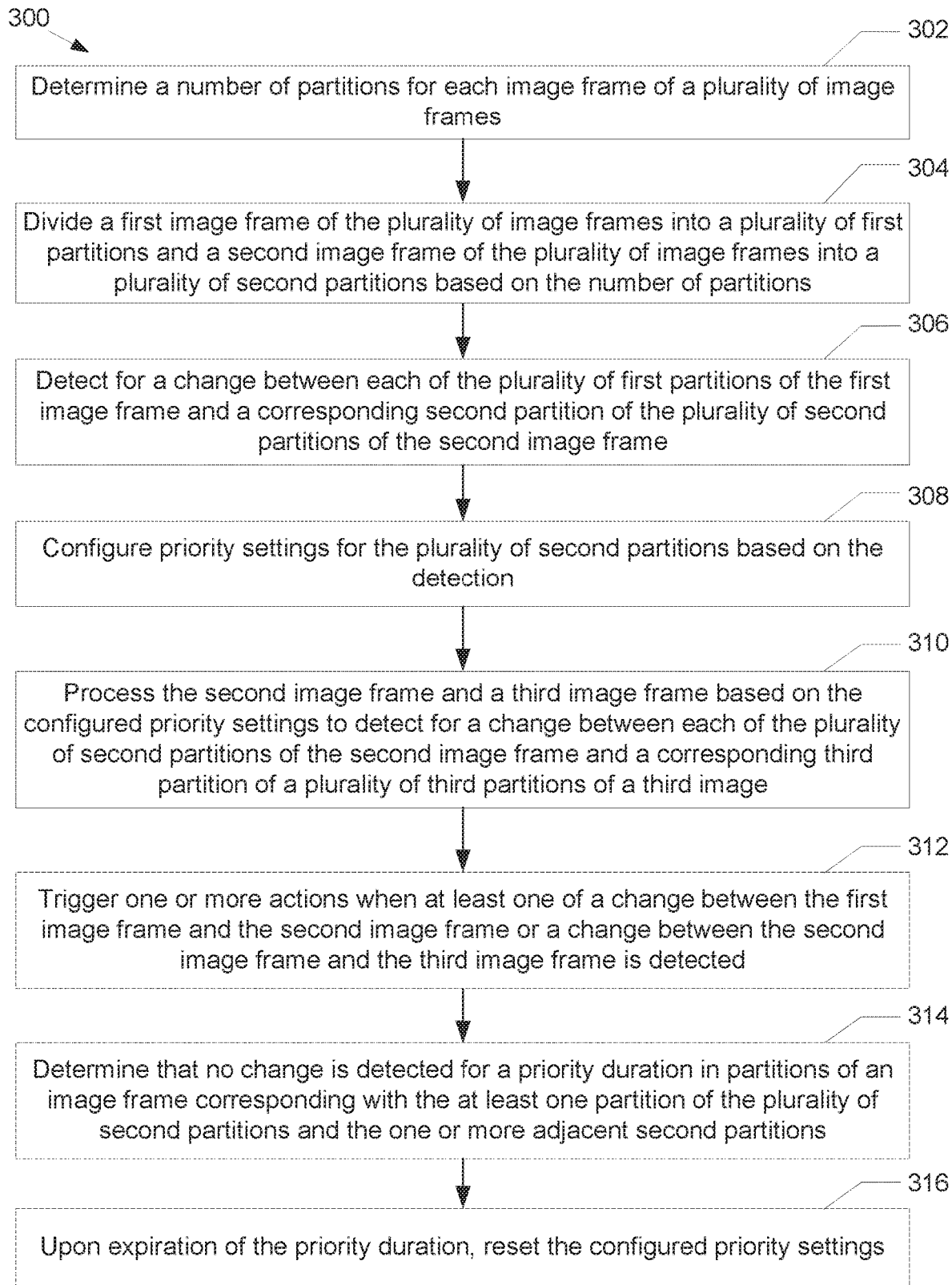
FIG. 3 illustrates an example process for partition-based image tracking using the example server of FIG. 2.

FIG. 3 illustrates an example process 300 for the partition-based image tracking using the example server 130 of FIG. 2. While FIG. 3 is described with reference to FIG. 2, it should be noted that the process steps of FIG. 3 may be performed by other systems.

At 302, the server 130 determines a number of partitions for each image frame of a plurality of image frames. In some aspects, the number of partitions for each image frame may be based on at least one of a computing resource or a change detection algorithm. In some aspects, each partition of the plurality of image frames may be assigned to a corresponding discrete processing thread.

At 304, the server 130 divides a first image frame of the plurality of image frames into a plurality of first partitions and a second image frame of the plurality of image frames into a plurality of second partitions based on the number of partitions. At 306, the server 130 detects for a change between each of the plurality of first partitions of the first image frame and a corresponding second partition of the plurality of second partitions of the second image frame.

In some aspects, the server 130 may detect for the change between each of the plurality of first partitions and the corresponding second partition by: computing a plurality of first checksums based on the plurality of first partitions, respectively, computing a plurality of second checksums based on the plurality of second partitions respectively, and comparing the plurality of first checksums and the plurality of second checksums respectively to detect for the change. Additionally, in some aspects, the server 130 may detect for the change between each of the plurality of first partitions and the corresponding second partition further by: determining that one or more first checksums of the plurality of first checksums match one or more second checksums of the plurality of second checksums, respectively, computing one or more refined first checksums based on one or more first partitions corresponding to the one or more first checksums and one or more refined second checksums based on one or more second partitions corresponding to the one or more second checksums, and comparing the one or more refined first checksums and the one or more refined second checksums to detect for the change. In such aspects, the plurality of first checksums and the plurality of second checksums are determined using a fast checksum algorithm, and wherein the one or more refined first checksums and the one or more refined second checksums are determined using a slow checksum algorithm.

In some aspects, the server 130 may detect for the change between each of the plurality of first partitions and the corresponding second partition by: determining that the change is detected between at least one partition of the plurality of first partitions and at least one corresponding partition of the plurality of second partitions; generating a difference image based on differences between the at least one partition of the plurality of first partitions and the at least one corresponding partition of the plurality of second partitions; determining at least one contour based on the difference image; identifying a changed area within the at least one partition of the plurality of second partitions based on the at least one contour; and storing a center point of the changed area.

At 308, the server 130 configures priority settings for the plurality of second partitions based on the detection. At 310, the server 130 processes the second image frame and a third image frame based on the configured priority settings to detect for a change between each of the plurality of second partitions of the second image frame and a corresponding third partition of a plurality of third partitions of a third image.

In some aspects, the priority settings may be configured by setting priority values to the plurality of second partitions based on proximity to a partition of the second partition where the change is detected. In such aspects, the server 130 may process the second image frame and a third image frame by processing the plurality of second partitions and the plurality of third partitions based on an order of the set priority values.

In some aspects, the server 130 may configure the priority settings by: assigning a high priority value to at least one partition of the plurality of second partitions, wherein a change is detected in the at least one partition of the plurality of second partitions from at least one corresponding partition of the plurality of first partitions, and assigning the high priority value to one or more adjacent second partitions that are adjacent to the at least one partition of the plurality of second partitions. In such aspects, the server 130 may configure the priority settings by assigning a low priority value to one or more partitions of the plurality of second partitions that are without a change from corresponding one or more partitions of the plurality of first partitions and are spaced apart from the at least one partition of the plurality of second partitions. In some aspects, the server 130 may process the second image frame and a third image frame by: performing a first detection for a change between the at least one partition of the plurality of second partitions where the high priority value is assigned and at least one corresponding partition of the plurality of third partitions, and performing, after the first detection, a second detection for a change between one or more partitions of the plurality of second partitions without the high priority value and one or more corresponding partitions of the plurality of third partitions. In some aspects, the server 130 may process the second image frame and a third image frame by placing the at least one partition of the plurality of second partitions and the one or more adjacent second partitions in a high priority queue, where high priority third partitions of the plurality of third partitions that respectively correspond with the at least one partition of the plurality of second partitions and the one or more adjacent second partitions in the high priority queue are processed before one or more partitions of the plurality of third partitions that are absent from the high priority queue.

In some aspects, the server 130 may configure the priority settings by: determining that a width of a changed region based on the detection exceeds a width change threshold, and resetting the priority settings upon the determination that the width of the changed region exceeds a width change threshold.

In some aspects, at 312, the server 130 may trigger one or more actions when at least one of a change between the first image frame and the second image frame or a change between the second image frame and the third image frame is detected. The one or more actions may involve the client device 140A.

In some aspects, at 314, the server 130 may determine that no change is detected for a priority duration in partitions of an image frame corresponding with the at least one partition of the plurality of second partitions and the one or more adjacent second partitions. In such aspects, at 316, upon expiration of the priority duration, the server 130 may reset the configured priority settings.

As discussed above, when the server 130 acquires image frames sequentially in time (e.g., using the image capturing device 110), the server 130 may divide each image frame into a specific number of partitions, and may detect for a change between each partition of a first image frame (e.g., previous image frame) and a corresponding partition of a second image frame (e.g., current image frame). The first and second image frames may be sequential in time, and the first image frame may be an image frame captured prior to capturing the second image frame. Each of the partitions may have a uniform size, and may correspond to a number of pixels.

If a change is detected in a particular partition in the second image frame when compared with a corresponding partition of the first image frame, the particular partition in the second image frame may be assigned with high priority. When the server 130 processes a subsequent image frame (e.g., a third image frame) to detect for a change from a previous image frame (e.g., a second image frame), the server 130 may prioritize processing partitions with the high priority. Further, partitions near the particular partition with the change may also be assigned with the high priority to account for situations where drastic changes may occur. For example, in a case where a moving object captured in the image frames causes a change between the image frames, the moving object may move fast or may drastically change directions of the movement, resulting in changes in the partitions in subsequent image frames that are near the particular partition. By assigning the high priority to partitions near the particular partition with a change, the server 130 may accommodate situations where an object may move and/or change directions fast (e.g., faster than a refresh rate of a camera).

In one example, to detect a region where a change has occurred, the server 130 may divide each image frame into Y partitions, and compare Y partitions of one image frame with Y partitions of the second image frame, respectively, in order to detect a change. If the server 130 detects a change in $Z^{th}$ partition of the Y partitions of the second image frame, the server 130 may assign a high priority to the $Z^{th}$ partition of the second image frame. If a change is detected in $Z^{th}$ partition of the second image frame, a change may be expected in $Z^{th}$ partition of subsequent image frames, and thus $Z^{th}$ partition of subsequent image frames should be prioritized for image tracking. Further, there is likelihood of a change occurring in a region near $Z^{th}$ partition. Hence, a high priority may be assigned to partitions adjacent to the $Z^{th}$ partition. By assigning the high priority to partitions adjacent to the partition with a change, the server 130 may accommodate situations where a fast-moving object may result in changes in the partitions in subsequent image frames that are adjacent to the $Z^{th}$ partition of the subsequent image frames.

In some aspects, the partitions with the high priority may be placed in a high priority queue in a queue for processing the partitions, such that the partitions with the high priority will be processed before partitions without the high priority. In the above example, $Z^{th}$ partition and the adjacent partitions adjacent to the $Z^{th}$ partition of the second image frame may be placed in the high priority queue, such that $Z^{th}$ partition and the adjacent partitions of the subsequent third image frame that correspond with $Z^{th}$ partition and the adjacent partitions of the second image frame in the high priority queue maybe processed to detect changes before processing other partitions of the third image frame. Further, when a fourth image frame is received, the server 130 may process $Z^{th}$ partition and the adjacent partitions of the fourth image frame that correspond with $Z^{th}$ partition and the adjacent partitions of the second image frame in the high priority queue to detect changes between the third image frame and the fourth image frame before processing other partitions of the fourth image frame.

After the high priority is assigned to the partitions, if the server 130 does not detect changes in the partitions with the high priority for a priority duration, the server 130 may reset the priority settings to remove the high priority from the partitions. Thus, if no change is detected in partitions of subsequent image frames that correspond to the partitions listed in the high priority queue, the server 130 may remove such partitions from the high priority queue. In the above example, if no change is detected in the $Z^{th}$ partition and the adjacent partitions of image frames for the priority duration after $Z^{th}$ partition and the adjacent partitions adjacent to $Z^{th}$ partition of the second image frame are placed in the high priority queue, the server 130 may remove $Z^{th}$ partition and the adjacent partitions adjacent to the $Z^{th}$ partition of the second image frame from the high priority queue. In some aspects, when a particular partition of an image frame is listed in the high priority queue, the server 130 may associate the particular partition in the high priority queue with a time stamp indicating a time of listing of the particular partition in the high priority queue. In such aspects, if a priority duration has passed since the time indicated in the time stamp, the particular partition associated with the time stamp may be removed from the high priority queue. In one example, the priority duration may be 1 second.

In some aspects, different priority values may be assigned to partitions based on proximity from a partition with a change. In such aspects, the partition with the change has the highest priority value and partitions further away from the partition with the change have lower priority values, such that the partitions closer to the partition with the change may be processed earlier based on the priority values. For example, if a change is detected in $Z^{th}$ partition, the highest priority value is assigned to $Z^{th}$ partition, and the second highest priority value is assigned to the adjacent partitions adjacent to $Z^{th}$ partition. The third highest priority value may be assigned to partitions bordering the adjacent partitions that are adjacent to $Z^{th}$ partition. In such an example, the server 130 may first process the $Z^{th}$ partition with the highest priority, then the adjacent partitions adjacent to $Z^{th}$ partition with the second highest priority, and then the partitions with the third highest priority.

In some aspects, the priority settings (e.g., high priority queue) for processing the partitions of image frames may be reset if the server 130 determines that a large change has occurred to the image frames. The server 130 may determine that a large change has occurred to the image frames if an area in the image frame that show a change from a previous image frame is large. For example, in cases where the image capturing device 110 is moved or is temporarily interfered or any other large changes have occurred to drastically affect the image capturing device 110, it may be beneficial to reset the priority settings for the partitions because such large changes may not accurately indicate likelihood of subsequent changes. In one or more implementations, the server 130 may determine whether to reset the priority settings based on a size of a changed region. In some aspects, the server 130 may reset the priority settings if a width of a changed region exceeds a threshold width. The threshold width may be a half of the width of the frame partition.

Figure 4:
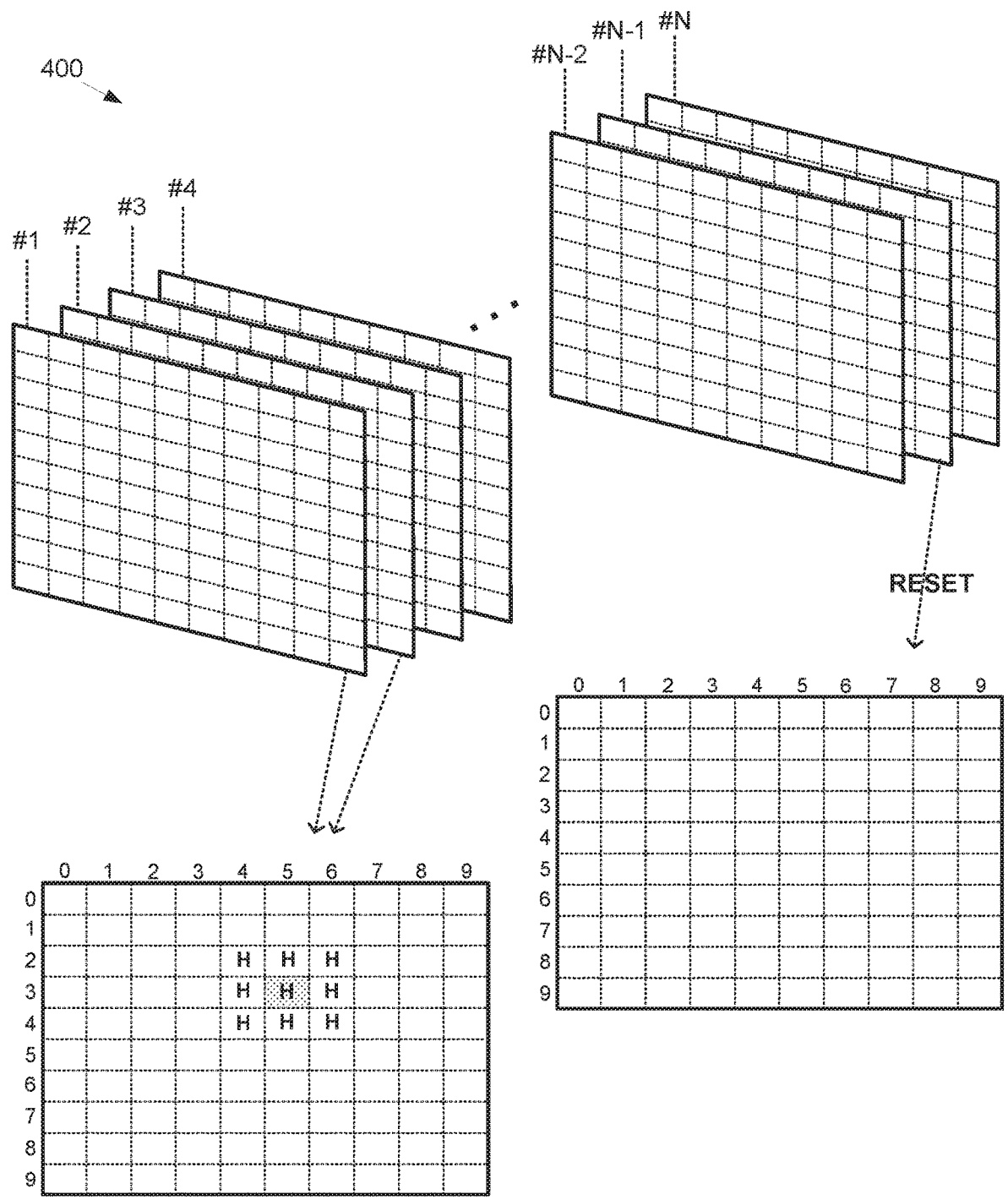
FIG. 4 is an example diagram illustrating dividing image frames into partitions and detecting changes in partitions of image frames, according to certain aspects of the disclosure.

FIG. 4 is an example diagram 400 illustrating dividing image frames into partitions and detecting changes in partitions of image frames, according to certain aspects of the disclosure. In the example diagram 400, N sequential image frames are acquired using the image capturing device 110. Each image frame is divided into 100 partitions. When the first 100 partitions of image frame #1 are compared with second 100 partitions of image frame #2, respectively, the server 130 may find changes in one or more second partitions of image frame #2. In the example diagram 400, the server 130 finds a change in partition (5, 3) of image frame #2 when compared with image frame #2. For example, the change in partition (5, 3) of image frame #2 may be due to a moving object and/or an object appearing in partition (5, 3), and/or a change in lighting in partition (5, 3). The server 130 sets high priority for partition (5, 3) of image frame #2 and the adjacent partitions that are adjacent to partition (5, 3) of image frame #2. Therefore, when the server 130 detects a change in image frame #3, the server 130 may place high priority for processing partition (5, 3) and the adjacent partitions of image frame #2 and corresponding partitions of image frame #3. Further, when the server 130 detects a change in image frame #4, the server 130 may place high priority for partitions of image frame #3 and partitions of image frame #4 that correspond with partition (5, 3) and the adjacent partitions of image frame #2. Hence, for image frames following after image frame #2, partitions corresponding with partition (5, 3) and the adjacent partitions of image frame #2 are assigned the high priority.

In the example diagram 400, no change is detected in partitions of subsequent image frames (frames #3 through # N−1) that correspond with partition (5, 3) and the adjacent partitions of image frame #2. At image frame # N−1, the priority duration has passed since image frame #2 is acquired and the high priority is placed in partition (5, 3) of image frame #2. Thus, the server 130 resets the priority settings and the high priority for partition (5, 3) and the adjacent partitions is removed.

In some situations, a change between successive frames may be so small that the detection of the change may be difficult. Such situations may occur if the image frames are acquired at a very fast rate and/or if an object tracked by image tracking is a slow moving object. Thus, in some aspects, the server 130 may detect for a change between two non-successive frames that are apart from each other by one or more image frames. In the example 400 of FIG. 4, for example, the server 130 may detect for a change between image frame #1 and image frame #3 by comparing the partitions of the image frame #1 and image frame #3. By comparing the non-successive image frames, the server 130 may be able to detect small changes that cannot be detected by comparing successive image frames.

In some situations, the server 130 may assign the high priority to additional partitions to account for a direction or an expected direction of a movement/change. For example, the image tracking on previous image frames shows that an object is moving to the left, the object may be likely to continue to move to the left. Thus, if the server 130 determines, based on image tracking on previous image frames, that an object is moving to the left and a change is detected at $Z^{th}$ partition of the current image frame, in addition to assigning high priority to the adjacent image frames, the server 130 may assign high priority to additional partitions on the left side of $Z^{th}$ partition to account for the leftward movement. As such, even if the object ends up moving fast and traverses across multiple partitions over the subsequent image frames, the changes may still be within the additional partitions on the left side of $Z^{th}$ partition.

In some aspects, the number of partitions may be determined based on available computing resources and/or latency of a comparison algorithm used to detect a change. For example, a higher processing power and/or a computationally lighter algorithm may allow the server 130 to handle processing more partitions per image frame. The server 130 may determine the number of partitions further based on the size of each image frame. For example, a higher processing power and/or a computationally lighter algorithm may be able to handle a larger image size (e.g., higher resolution) that has more data.

The partitions of two image frames being compared to detect for a change may be assigned to multiple (asynchronous) threads or multiple processor cores for processing, such that each thread or each processor may handle a certain number of partitions. For example, if each image frame is divided into 100 partitions and 100 threads or 100 processor cores are available, one partition of an image frame may be assigned to one thread or one processor core. In another example, if each image frame is divided into 100 partitions and 50 threads or 50 processor cores are available, two partitions may be assigned to one thread or one processor core. Such assignment of the partitions to multiple threads or processor cores may enable asynchronous processing of the partitions. In some aspects, when the partitions are assigned to multiple asynchronous threads, asynchronous threads may be distributed to discrete processor cores, respectively, to avoid contention between the threads.

The server 130 may detect for a change in each partition of an image frame based on a checksum of image data (e.g., pixel values) associated with each partition of the image frame and a checksum of image data associated with a corresponding partition of a previous image frame. In particular, the server 130 may calculate checksums associated with partitions of the second image frame (e.g., current image frame), respectively, and may calculate checksums associated with partitions of the first image frame (e.g., previous image frame), respectively. Subsequently, the server 130 may compare a checksum of each partition of the second image frame with a checksum of a corresponding partition of the first image frame. The server 130 determines that there is change in a particular partition of the second image frame if the comparison finds a difference between a checksum of the particular partition of the second image frame and a checksum of a corresponding partition of the first image frame. Thus, for example, the server 130 may place the particular partition of the second image frame in the high priority queue if the checksum of the particular partition of the second image frame does not match the checksum of a corresponding partition of the first image frame. The comparison of checksums of partitions of two image frames may be less time consuming than comparing individual pixels of two image frames, at least because a number of partitions to compare may be significantly less than a number of pixels to compare.

A checksum for a particular partition may be calculated by iterating over the image data within the particular partition. For example, a checksum may be calculated based on the image data within the particular partition such that a change in one or more pixels in the particular partition may result in a change in the checksum. In some aspects, a checksum for a particular partition may be calculated using a checksum algorithm on pixel data of the particular partition. The server 130 may select a checksum algorithm based on computational resources and/or processing power of the server 130. For example, a checksum may be calculated based on a cyclic redundancy check (CRC) algorithm, such as CRC16 and CRC32, or may be calculated based on MD5 checksum algorithm or an SHA256 checksum algorithm.

In some aspects, the server 130 may calculate a checksum for a partition in two stages. In a first stage, an initial checksum value is calculated for each partition by utilizing a high-speed checksum calculation (e.g., with 64 bits or fewer). If an initial checksum value of a particular partition of the current image frame does not match an initial checksum value of a corresponding partition of the previous image frame, the server 130 determines that there is a change in the particular partition of the current frame and may not calculate a refined checksum value for the particular partition. On the other hand, if an initial checksum value of a particular partition of the current image frame matches an initial checksum value of a corresponding partition of the previous image frame, then the server 130 utilizes a slow-speed checksum calculation (e.g., with more than 64 bits) to calculate a refined checksum value for the particular partition of the current image frame and a refined checksum value for the corresponding partition of the previous image frame, in order to confirm whether there is a change in the particular partition of the current image frame. If the refined checksum value for the particular partition of the current image frame is different from the refined checksum value for the corresponding partition of the previous image frame, the server 130 determines that there is a change in the particular partition of the current frame. The high-speed checksum calculation may allow rough comparison of the partitions and thus may avoid heavy computation of the slow-speed checksum calculation upfront. After the high-speed checksum calculation, the slow-speed checksum calculation may be used to confirm the results from the high-speed checksum calculation.

Figure 5:
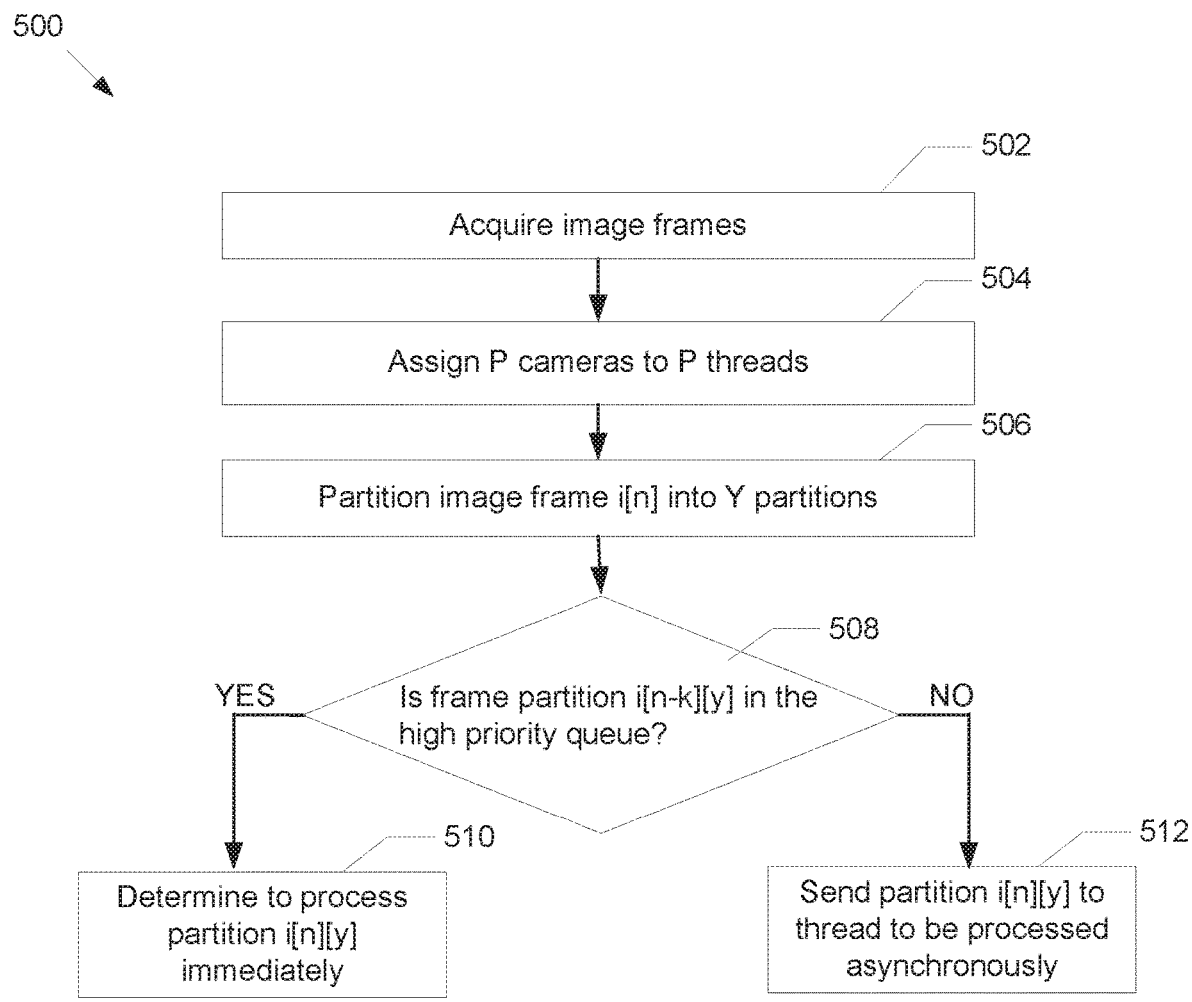
FIG. 5 is an example process illustrating prioritization of processing of an image partition in the partition-based image tracking using the example server of FIG. 2.

FIG. 5 is an example process 500 illustrating prioritization of processing of an image partition in the partition-based image tracking using the example server of FIG. 2. While FIG. 5 is described with reference to FIG. 2, it should be noted that the process steps of FIG. 5 may be performed by other systems.

At 502, the server 130 may acquire image frames captured by the image capturing device 110. If the image capturing device 110 has multiple cameras, image frames captured by each camera is assigned to a thread. Thus, at 504, the server 130 may assign P cameras to P threads respectively, such that image frames captured from each of P cameras is handled by a corresponding thread of P threads. At 506, in each thread, the server 130 divides image frames captured by a corresponding camera into Y partitions.

At 508, the server 130 determines whether a particular frame partition of a previous image frame is in a high priority queue. If the particular frame partition of the previous image frame is in the high priority queue, at 510, the server 130 immediately processes a frame partition of the current image frame that corresponds with the particular frame partition of the previous image frame, to detect for a change. If the particular frame partition of the previous image frame is not in the high priority queue, at 512, the server 130 assigns a frame partition of the current image frame that corresponds with the particular frame partition of the previous image frame to a processing thread to be processed asynchronously.

In some aspects, when the server 130 detects a change in a partition of a current image frame, the server 130 may further process the current image frame to determine additional details about the change, such as characteristics of the change and/or the location of the change within the partition. In one or more implementations, when the server 130 detects a change in a partition, the server 130 may divide the partition with the change into multiple sub-partitions. Then, the multiple sub-partitions of the current image frame may be compared with corresponding multiple sub-partitions of the previous image frame to determine which sub-partitions have changes. Processing the sub-partitions may enable the server 130 to more accurately determine the location of the change within the partition with the change.

In one or more implementations, when the server detects a change in one or more partitions of a current image frame, the server 130 may generate contours representing the change in the one or more partitions of the current image frame, and identify the changed area in the current image frame based on the contours. The contours may be based on the difference (e.g., absolute difference) between pixel values of one or more partitions of the current image frame and pixel values of one or more partitions of the previous image frame where the change is detected. Relying on the contours, for example, may allow the processing to focus on a shape outlined by the contours instead of considering shading or lighting of each partition. In some aspects, instead of considering the entire image, the server 130 may expedite the process to find details in the changes by focusing on contours within the partition with the change and/or partitions adjacent to the partition with the change between the current and previous image frames. In some aspects, the server 130 may generate the contours by performing one or more image processing approaches, such as edge detection.

The server 130 may perform other image processing to improve the computation of the contours. In particular, the server 130 may convert the image frames to grayscale (e.g., for efficient processing) to simplify the image processing. Further, the server 130 may perform noise reduction on the image frames (e.g., via Gaussian blur or a median filter or a threshold operation). To reduce noise, for example, the server 130 may remove noise of motion showing a change that is smaller than 1% of a size of a partition. For example, if the size of each partition is 1000×1000 pixels, then a change that is smaller than 10×10 pixels may be considered a noise and thus may be removed. In another example, to reduce noise, the server 130 may perform a threshold operation to limit a pixel value to a pixel threshold, such that any pixel value greater than the pixel threshold is changed to the pixel threshold.

After generating the contours of the changes, the server 130 may determine a changed area based on the contours. The server 130 may determine a center point of the changed area based on the contours. As such, the server 130 may be able to determine a center point of the change within a partition with the change, and thus may be able to more accurately determine the location of the change after the partition with the change is detected. Further, in one example, by comparing the center points of the changed areas based on the contours generated from different sets of image frames, a change may be tracked more accurately than the partition level.

Figure 6:
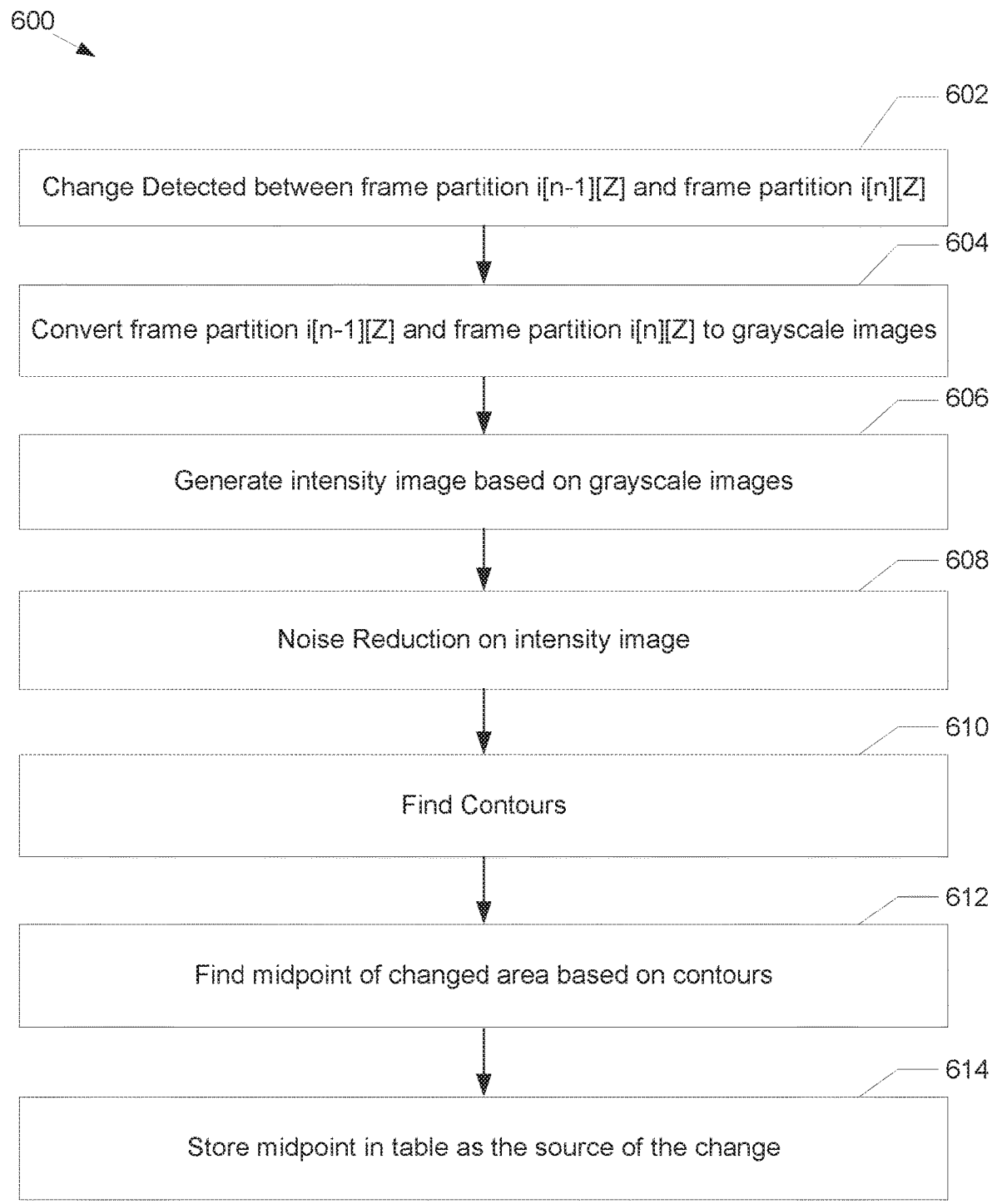
FIG. 6 is an example process illustrating computation of contour of changes during the partition-based image tracking using the example server of FIG. 2.

FIG. 6 is an example process 500 illustrating computation of contour of changes during the partition-based image tracking using the example server of FIG. 2. While FIG. 5 is described with reference to FIG. 2, it should be noted that the process steps of FIG. 5 may be performed by other systems.

At 602, the server 130 determines that a change is detected in partition Z of $n^{th}$ image frame (current image frame) when compared with partition Z of $(n-1)^t$ image frame (previous image frame). At 604, the server 130 converts partition Z of the previous image frame and partition Z of the current image frame.

At 606, the server 130 generates an intensity image based on the grayscale image of partition Z of the previous image frame and the grayscale image of partition Z of the current image frame. The intensity image may be generated by calculating absolute differences between the pixel values of the grayscale image of partition Z of the previous image frame and pixel values of the grayscale image of partition Z of the current image frame.

At 608, the server 130 performs noise reduction on the intensity image. In some aspects, the noise reduction may be performed by blurring the intensity image based on a threshold.

At 610, the server 130 finds contours on the intensity image after the noise reduction. At 612, the server 130 determines the changed area within partition Z based on the contours and finds a midpoint of the changed area. At 614, the server 130 stores a location of the midpoint as a center point of the change. In some aspects, the server 130 may compare the location of the midpoint of the changed area for the current two image frames and a location of the midpoint of the changed area for the previous two image frames, in order to track a movement.

When the server 130 determines that a change is detected in an image frame, the server 130 may trigger one or more actions. For example, when the server 130 detects a change in an image frame, the server 130 may trigger the client devices 140 to perform one or more of triggering an alarm, displaying a notification, sending a notification message to a particular user, storing an image with a change in a storage device, displaying an image indicating a partition with a change, etc.

FIGS. 7A-7C are example diagrams illustrating the partition-based image tracking in multiple image frames, according to certain aspects of the disclosure. FIG. 7A shows a first image frame 700 and FIG. 7B shows a subsequent second image frame 730. For example, the first image frame 700 and the second image frame 730 are acquired using the image capturing device 110 pointed to an area with trees, a road, and mountains.

The first image frame 700 is divided into 100 partitions and the second image frame 730 is divided into 100 partitions. Between the first image frame 700 and the second image frame 730, a change occurs when a star 732 appears in the second image frame 730. Therefore, when the server compares the partitions of the first image frame 700 and the partitions of the second image frame 730 respectively, the server 130 detects a change in partition (5,0) of the second image frame 730. As illustrated in a priority diagram 750 of FIG. 7C, the server 130 assigns high priority to partition (5, 0) of the second image frame 730 and the adjacent partitions including partitions (4, 0), (4, 1), (5, 1), (6, 0), and (6, 1). Therefore, for the subsequent image frames, the partitions corresponding to partition (5, 0) and the adjacent partitions are processed first to detect for a change before processing other partitions.

FIGS. 8A-8C are example diagrams illustrating the partition-based image tracking in multiple image frames, according to certain aspects of the disclosure. FIG. 8A shows a third image frame 800 and FIG. 8B shows a subsequent fourth image frame 830. For example, the third image frame 800 and the fourth image frame 830 are acquired using the image capturing device 110 pointed to an area with trees, a road, and mountains. The third image frame 800 and the fourth image frame 830 may be acquired after acquiring the first image frame 700 and the second image frame 730 of FIG. 7A.

The third image frame 800 is divided into 100 partitions and the fourth image frame 830 is also divided into 100 partitions. Between the third image frame 800 and the fourth image frame 830, a change has occurred when a bird 834 appears in the fourth image frame 830. Therefore, when the server 130 compares the partitions of the third image frame 800 and the partitions of the fourth image frame 830 respectively, the server 130 detects a change in partition (6, 5) of the fourth image frame 830. As illustrated in a priority diagram 850 of FIG. 8C, the server 130 assigns high priority to partition (6, 4) of the fourth image frame 830 and the adjacent partitions including partitions (5, 3), (5, 4), (5, 5), (6, 3), (6, 5), (7, 3), (7, 4), and (7, 5). Therefore, for the subsequent image frames, the partitions corresponding to partition (6, 4) and the adjacent partitions are processed first to detect for a change before processing other partitions. Further, the high priority previously assigned to partition (5, 0) and the partitions adjacent to partition (5, 0) due to the star 732 appearing in the second image frame 730 has been removed because no change is detected in partition (5, 0) for a priority duration. As shown in FIGS. 8A and 8B, there is no change in a position or a shape of the star 802 and the star 832.

FIGS. 9A-9C are example diagrams illustrating the partition-based image tracking in multiple image frames, according to certain aspects of the disclosure. FIG. 9A shows a fourth image frame 900 and FIG. 9B shows a subsequent fifth image frame 930. For example, the fourth image frame 900 and the fifth image frame 930 are acquired using the image capturing device 110 pointed to an area with trees, a road, and mountains. The fourth image frame 900 may be the same as the fourth image frame 830 of FIG. 8B and thus may be acquired after acquiring the third image 800 of FIG. 8B, and the fifth image frame 930 may be acquired after acquiring the fourth image frame 900.

The fourth image frame 900 is divided into 100 partitions and the fifth image frame 930 is also divided into 100 partitions. Between the fourth image frame 900 and the fifth image frame 930, a change has occurred when a bird 904 shown in the fourth image frame 900 moves to the left and thus a bird 934 in the fifth image frame 930 is in a different position. Therefore, when the server 130 compares the partitions of the fourth image frame 900 and the partitions of the fifth image frame 930 respectively, the server 130 detects a change in partitions (6, 5) and (5, 5) of the fifth image frame 930. As illustrated in a priority diagram 950 of FIG. 8C, the server 130 assigns high priority to partitions (6, 4) and (5, 4) of the fifth image frame 930 and the adjacent partitions including partitions (4, 3), (4, 4), (4, 5), (5, 3), (5, 5), (6, 3), (6, 5), (7, 3), (7, 4), and (7, 5). Further, the server may determine based on the detection of the changes illustrated in FIGS. 8A-8C and FIGS. 9A-9C that the bird on the image frames is moving to the left. Thus, the server 130 may assign high priority to additional partitions on the left side by assigning high priority to partitions (3, 3), (3, 4), (3, 5), to account for the leftward motion of the bird. Therefore, for the subsequent image frames, the partitions corresponding to partitions (6, 4) and (5, 4), the adjacent partitions, and the additional partitions (3, 3), (3, 4), (3, 5) are processed first to detect for a change before processing other partitions.

Hardware Overview

Figure 10:
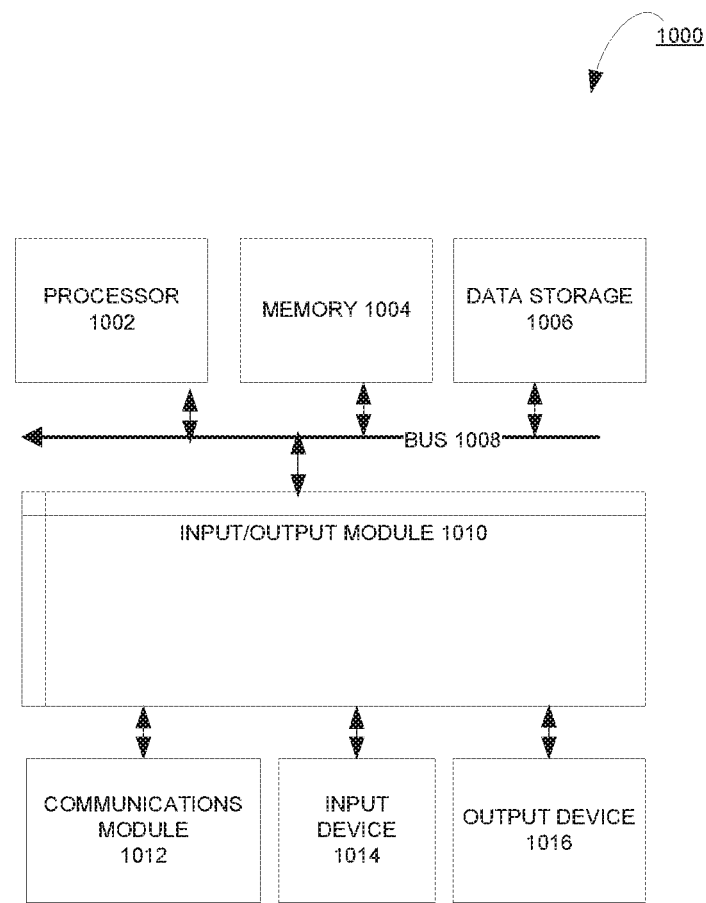
FIG. 10 is a block diagram illustrating an example computer system with which the clients and servers of FIG. 2 can be implemented.

FIG. 10 is a block diagram illustrating an example computer system 1000 with which the server 130 and the client device 140A of FIG. 2 can be implemented. In certain aspects, the computer system 1000 may be implemented using hardware or a combination of software and hardware, either in a dedicated server, or integrated into another entity, or distributed across multiple entities.

Computer system 1000 (e.g., server 130 and client device 140A) includes a bus 1008 or other communication mechanism for communicating information, and a processor 1002 (e.g., processor 252, 236) coupled with bus 1008 for processing information. According to one aspect, the computer system 1000 can be a cloud computing server of an IaaS that is able to support PaaS and SaaS services. According to one aspect, the computer system 1000 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 1000 may be implemented with one or more processors 1002. Processor 1002 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memory 240 and 260), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry. Expansion memory may also be provided and connected to computer system 1000 through input/output module 1010, which may include, for example, a SIMM (Single In Line Memory Module) card interface. Such expansion memory may provide extra storage space for computer system 1000, or may also store applications or other information for computer system 1000. Specifically, expansion memory may include instructions to carry out or supplement the processes described above, and may include secure information also. Thus, for example, expansion memory may be provided as a security module for computer system 1000, and may be programmed with instructions that permit secure use of computer system 1000. In addition, secure applications may be provided via the SIMM cards, along with additional information, such as placing identifying information on the SIMM card in a non-hackable manner.

The instructions may be stored in the memory 1004 and implemented in one or more computer program products, e.g., one or more modules of computer program instructions encoded on a computer readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices (e.g., input device 256, output device 254). The input/output module 1010 can be any input/output module. Example input/output modules 1010 include data ports such as USB ports. In addition, input/output module 1010 may be provided in communication with processor 1002, so as to enable near area communication of computer system 1000 with other devices. The input/output module 1010 may provide, for example, wired communication in some implementations, or wireless communication in other implementations, and multiple interfaces may also be used. The input/output module 1010 is configured to connect to a communications module 1012. Example communications modules 1012 (e.g., communications module 258 and 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 1012 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 1012 sends and receives electrical, electromagnetic, or optical signals that carry digital data streams representing various types of information. The network link typically provides data communication through one or more networks to other data devices. For example, the network link of the communications module 1012 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 1012, which carry the digital data to and from computer system 1000, are example forms of transmission media.

Computer system 1000 can send messages and receive data, including program code, through the network(s), the network link, and communications module 1012. In the Internet example, a server might transmit a requested code for an application program through the Internet, the ISP, the local network, and communications module 1012. The received code may be executed by processor 1002 as it is received, and/or stored in data storage 1006 for later execution.

In certain aspects, the input/output module 1010 is configured to connect to a plurality of devices, such as an input device 1014 (e.g., input device 256) and/or an output device 1016 (e.g., output device 254). Example input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 1016 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 1016 may comprise appropriate circuitry for driving the output device 1016 to present graphical and other information to a user.

According to one aspect of the present disclosure, the client 140A can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. Processor 1002 may process the executable instructions and/or data structures by remotely accessing the computer program product, for example by downloading the executable instructions and/or data structures from a remote server through communications module 1012 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 1002 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 1006. Volatile media include dynamic memory, such as memory 1004. Transmission media include coaxial cables, copper wire, and fiber optics, including the wires that comprise bus 1008. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 1008. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for partition-based image tracking, the method comprising:
   determining a number of partitions for each image frame of a plurality of image frames;
   dividing a first image frame of the plurality of image frames into a plurality of first partitions and a second image frame of the plurality of image frames into a plurality of second partitions based on the number of partitions;
   detecting for a change between each of the plurality of first partitions of the first image frame and a corresponding second partition of the plurality of second partitions of the second image frame;
   configuring priority settings for the plurality of second partitions based on the detection; and
   processing the second image frame and a third image frame based on the configured priority settings to detect for a change between each of the plurality of second partitions of the second image frame and a corresponding third partition of a plurality of third partitions of a third image;
   wherein the priority settings are configured by setting priority values for the plurality of second partitions based on proximity to a partition of the second partition where the change is detected.

2. The computer-implemented method of claim 1, wherein the number of partitions for each image frame of the plurality of image frames is based on at least one of a computing resource or a change detection algorithm.

3. The computer-implemented method of claim 1, wherein each partition of the plurality of image frames is assigned to a corresponding discrete processing thread.

4. The computer-implemented method of claim 1, wherein the detecting for the change between each of the plurality of first partitions and the corresponding second partition comprises:
   computing a plurality of first checksums based on the plurality of first partitions respectively;
   computing a plurality of second checksums based on the plurality of second partitions respectively;
   comparing the plurality of first checksums and the plurality of second checksums respectively to detect for the change.

5. The computer-implemented method of claim 4, wherein the detecting for the change between each of the plurality of first partitions and the corresponding second partition further comprises:
   determining that one or more first checksums of the plurality of first checksums match one or more second checksums of the plurality of second checksums, respectively;
   computing one or more refined first checksums based on one or more first partitions corresponding to the one or more first checksums and one or more refined second checksums based on one or more second partitions corresponding to the one or more second checksums;
   comparing the one or more refined first checksums and the one or more refined second checksums to detect for the change,
   wherein the plurality of first checksums and the plurality of second checksums are determined using a fast checksum algorithm, and wherein the one or more refined first checksums and the one or more refined second checksums are determined using a slow checksum algorithm.

6. The computer-implemented method of claim 1, wherein the processing the second image frame and the third image frame comprises processing the plurality of second partitions and the plurality of third partitions based on an order of the set priority values.

7. The computer-implemented method of claim 1, wherein the configuring the priority settings comprises:
   assigning a high priority value to at least one partition of the plurality of second partitions, wherein a change is detected in the at least one partition of the plurality of second partitions from at least one corresponding partition of the plurality of first partitions; and
   assigning the high priority value to one or more adjacent second partitions that are adjacent to the at least one partition of the plurality of second partitions.

8. The computer-implemented method of claim 7, wherein the configuring the priority settings further comprises:
   assigning a low priority value to one or more partitions of the plurality of second partitions that are without a change from corresponding one or more partitions of the plurality of first partitions and are spaced apart from the at least one partition of the plurality of second partitions.

9. The computer-implemented method of claim 7, wherein the processing the second image frame and the third image frame comprises:
   performing a first detection for a change between the at least one partition of the plurality of second partitions where the high priority value is assigned and at least one corresponding partition of the plurality of third partitions; and
   performing, after the first detection, a second detection for a change between one or more partitions of the plurality of second partitions without the high priority value and one or more corresponding partitions of the plurality of third partitions.

10. The computer-implemented method of claim 7, wherein the processing the second image frame and the third image frame comprises:
    placing the at least one partition of the plurality of second partitions and the one or more adjacent second partitions in a high priority queue,
    wherein high priority third partitions of the plurality of third partitions that respectively correspond with the at least one partition of the plurality of second partitions and the one or more adjacent second partitions in the high priority queue are processed before one or more partitions of the plurality of third partitions that are absent from the high priority queue.

11. The computer-implemented method of claim 7, further comprising:
    determining that no change is detected for a priority duration in partitions of an image frame corresponding with the at least one partition of the plurality of second partitions and the one or more adjacent second partitions; and
    upon expiration of the priority duration, resetting the configured priority settings.

12. The computer-implemented method of claim 1, wherein the configuring the priority settings comprises:
    determining that a width of a changed region based on the detection exceeds a width change threshold; and
    resetting the priority settings upon the determination that the width of the changed region exceeds the width change threshold.

13. The computer-implemented method of claim 1, wherein the detecting for the change between each of the plurality of first partitions and the corresponding second partition comprises:
    determining that the change is detected between at least one partition of the plurality of first partitions and at least one corresponding partition of the plurality of second partitions;
    generating a difference image based on differences between the at least one partition of the plurality of first partitions and the at least one corresponding partition of the plurality of second partitions;
    determining at least one contour based on the difference image;
    identifying a changed area within the at least one partition of the plurality of second partitions based on the at least one contour; and
    storing a center point of the changed area.

14. The computer-implemented method of claim 1, further comprising:
    triggering one or more actions when at least one of a change between the first image frame and the second image frame or a change between the second image frame and the third image frame is detected.

15. A system for partition-based image tracking, the system comprising:
    a memory; and
    a processor configured to execute instructions which, when executed, cause the processor to:
    determine a number of partitions for each image frame of a plurality of image frames;
    divide a first image frame of the plurality of image frames into a plurality of first partitions and a second image frame of the plurality of image frames into a plurality of second partitions based on the number of partitions;
    detect for a change between each of the plurality of first partitions of the first image frame and a corresponding second partition of the plurality of second partitions of the second image frame;
    configure priority settings for the plurality of second partitions based on the detection; and
    process the second image frame and a third image frame based on the configured priority settings to detect for a change between each of the plurality of second partitions of the second image frame and a corresponding third partition of a plurality of third partitions of a third image;
    wherein the processor configured to detect for the change between each of the plurality of first partitions and the corresponding second partition is configured to:
    compute a plurality of first checksums based on the plurality of first partitions respectively;
    compute a plurality of second checksums based on the plurality of second partitions respectively; and
    compare the plurality of first checksums and the plurality of second checksums respectively to detect for the change.

16. The system of claim 15, wherein the processor configured to configure the priority settings is further configured to:
    assign a high priority value to at least one partition of the plurality of second partitions, wherein a change is detected in the at least one partition of the plurality of second partitions from at least one corresponding partition of the plurality of first partitions; and
    assign the high priority value to one or more adjacent second partitions that are adjacent to the at least one partition of the plurality of second partitions.

17. The system of claim 16, wherein the processor configured to process the second image frame and the third image frame is configured to:
    place the at least one partition of the plurality of second partitions and the one or more adjacent second partitions in a high priority queue,
    wherein high priority third partitions of the plurality of third partitions that respectively correspond with the at least one partition of the plurality of second partitions and the one or more adjacent second partitions in the high priority queue are processed before one or more partitions of the plurality of third partitions that are absent from the high priority queue.

18. A non-transitory machine-readable storage medium comprising machine-readable instructions for causing a processor to execute a method for partition-based image tracking, comprising
    determining a number of partitions for each image frame of a plurality of image frames;
    dividing a first image frame of the plurality of image frames into a plurality of first partitions and a second image frame of the plurality of image frames into a plurality of second partitions based on the number of partitions;
    detecting for a change between each of the plurality of first partitions of the first image frame and a corresponding second partition of the plurality of second partitions of the second image frame;
    configuring priority settings for the plurality of second partitions based on the detection such that detected changes are associated with increased priority; and
    processing the second image frame and a third image frame according to an order based on the configured priority settings to detect for a change between each of the plurality of second partitions of the second image frame and a corresponding third partition of a plurality of third partitions of a third image.

* * * * *